United States Patent [19]

Boscolo

[11] Patent Number: 4,675,660
[45] Date of Patent: Jun. 23, 1987

[54] CONTAINER LIQUID LEVEL SENSING UTILIZING A FILLING TUBE

[75] Inventor: Antonio Boscolo, Trieste, Italy

[73] Assignee: TETRA DEV-CO Consorzio di Studio e Ricerca Industriale, Modena, Italy

[21] Appl. No.: 817,495

[22] Filed: Jan. 9, 1986

[30] Foreign Application Priority Data

Jan. 9, 1985 [IT] Italy .............................. 83 305A/85

[51] Int. Cl.⁴ ............................................. G08B 21/00
[52] U.S. Cl. ................................ 340/612; 73/290 V; 141/95; 340/621; 367/908; 377/19
[58] Field of Search ............. 340/612, 621; 73/290 V; 367/908; 141/94, 95; 377/19; 222/64

[56] References Cited

U.S. PATENT DOCUMENTS

| | | | |
|---|---|---|---|
| 2,787,160 | 4/1957 | Van Valkenburg | 73/290 V |
| 2,998,723 | 9/1961 | Smith, Jr. et al. | 73/304 R |
| 3,520,186 | 7/1970 | Adams et al. | 73/290 V |
| 3,851,333 | 11/1974 | Fishman | 73/290 V X |
| 4,182,177 | 1/1980 | Prough | 73/290 V |
| 4,240,285 | 12/1980 | Langdon | 73/290 V X |
| 4,313,343 | 2/1982 | Kobayashi et al. | 73/290 V |

*Primary Examiner*—James L. Rowland
*Assistant Examiner*—Daniel Myer
*Attorney, Agent, or Firm*—Diller, Ramik & Wight

[57] ABSTRACT

Procedure to measure the level (14) of a liquid (13) by means of elastic waves, such liquid (13) being contained within an axially moving tube (11) and cooperating with a filler tube (12), the filler tube (12) being used as an element in the transmission of elastic waves to the liquid (13), such elastic waves being picked up (16) outside the axially moving tube (11).

Device (10) to carry out the above procedure, which device (10) cooperates with a filler tube (12) and comprises:
- at least one transducer (15) to transmit energization of the vibration of the filler tube (12), and
- at least one receiver transducer (16) located outside the axially moving tube (11).

29 Claims, 11 Drawing Figures

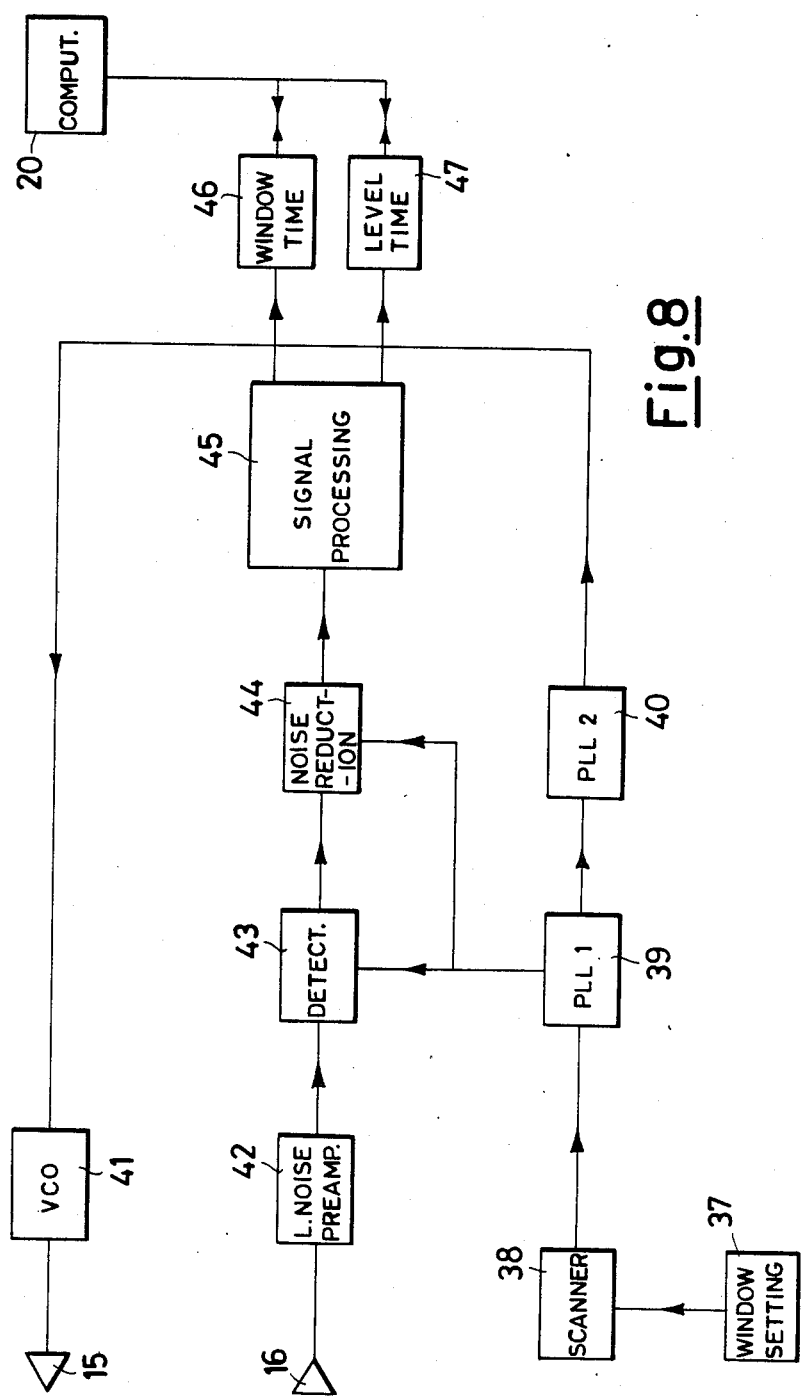

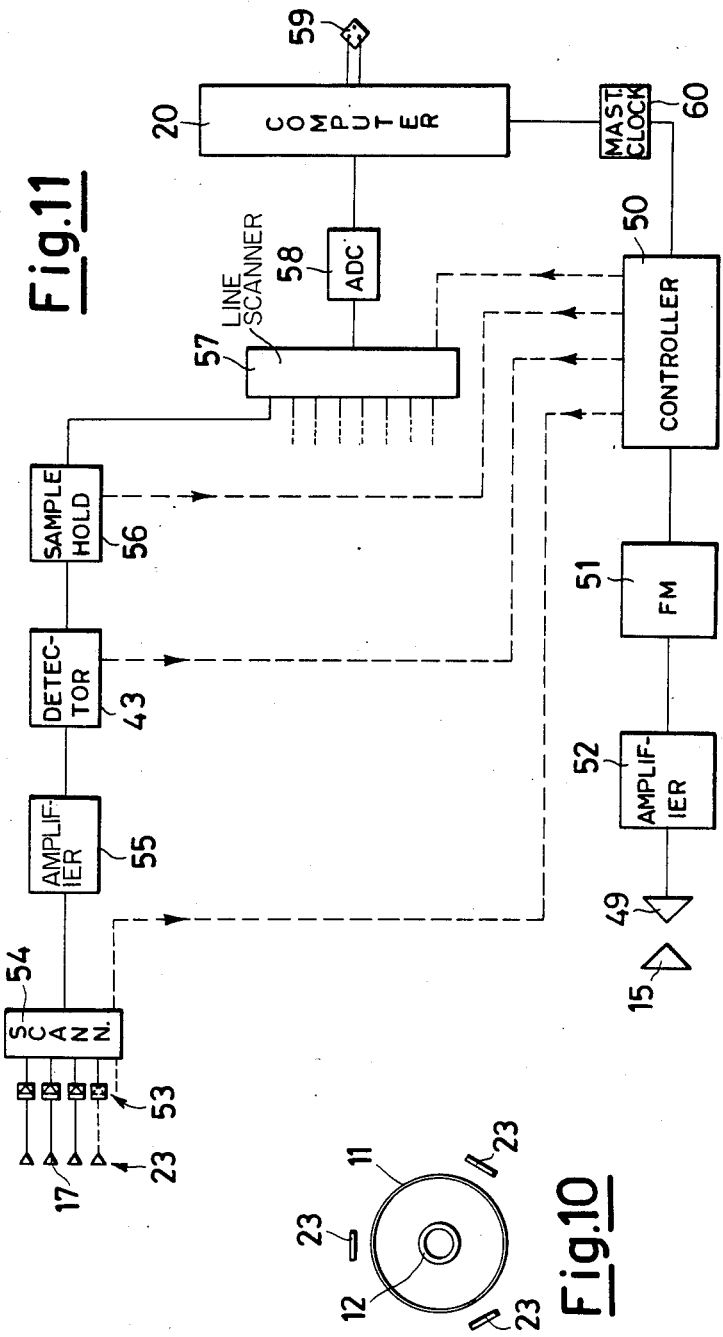

CONTAINER LIQUID LEVEL SENSING UTILIZING A FILLING TUBE

This invention concerns a procedure to measure the level of a liquid. To be more exact, the procedure of the invention has the purpose of measuring the level of a liquid by means of elastic waves, which are preferably of an ultrasonic frequency, within a tube running in a lengthwise direction, individual containers full of liquid being obtained from such tube.

The invention also concerns a device that employs such procedure. However, the invention shall not be deemed to be limited to such applications and can be employed to measure the level of any liquid within containers of widely varying types.

For instance, a typical application of this invention could concern the field of filling milk containers or other containers made of flexible composite materials.

In a particular procedure which the invention specifically concerns, such containers are formed at the same time as they are filled, that is to say, a tube of composite material, hereinafter called a "cardboard tube", is formed from a band of such material.

Such cardboard tube is welded along a generating line by means of known techniques and is filled with a liquid up to a given level, which is kept constant.

An appropriate device cuts such tube into individual containers below the level of the liquid and seals these containers by known methods.

The present invention has the precise objective of carrying out measurement of the level of liquid in the cardboard tube formed from the band of material, which runs in a lengthwise direction, as earlier described.

Such measurement is important in that the level of liquid must not exceed a set maximum level if the liquid is not to run out of the cardboard tube. The invention is especially suitable for the measurement of the level of liquids in sterile conditions.

The known art has employed for such applications hitherto dynamic intrusive elements (for instance, floats) or static elements (conductive probes, for example) within the sterile area, with the relative consequent problems of maintenance and sterilization operations.

A purpose of the invention is therefore the provision of a level measurement device which does not require elements working by means of contact, such as floats or similar position transducers. The invention has the further purpose of employing directly the filler tube, which is normally included in filling plants, as an element in the chain of transmission of the measurement signal.

It has been found that measurement by transmission is not possible by conventional methods since the attenuation of the of the signal through the cardboard tube is too great.

In fact, such method of measurement arranges for a signal transmitter and a signal receiver to be positioned respectively on opposite sides of the cardboard tube. Such transmitter and receiver cannot be in contact with the cardboard tube because the latter is in continuous lengthwise movement.

There is therefore no adaptation of the acoustic impedance in the passage between the source of vibrations (such as ultrasounds), the air, the cardboard tube, the liquid and, once more, the cardboard tube and the air.

This lack of adaptation of impedance causes a signal attenuation of the order of 120 decibels. When operating in this manner, therefore, it is not possible to carry out any measurement.

The invention proposes to obtain a method of propagation of the acoustic wave, and more especially of ultrasonic vibrations, with an attenuation having a value such as to enable the signal to be measured and therefore remaining within an acceptable signal/disturbance relationship. This is attained in a preferred embodiment by employing the filler tube itself as an element in the transmission chain.

It is possible in this way to obtain an adaptation of the acoustic impedance such as to enable a signal of a level sufficient for performance of the measurement to be transmitted. In fact, an elastic vibration can be transmitted directly to the filler tube by an appropriate transducer.

According to the invention the acoustic impedance of transmission from such transducer to the filler tube is adapted advantageously in an excellent manner by means of adapters placed between the transducer and the filler tube.

The invention provides for the transmission of the signal through the filler tube to take place by means of a mode of radial and flexural vibration of the filler tube itself. This leads to excellent transfer of the signal to the filling liquid.

In fact, the elastic field is propagated only lengthwise in liquids, and therefore a very small fraction of energy would be yielded by the lengthwise mode of the tube to the liquid unless the material of the filler tube had a characteristic impedance very close to that of the liquid. For instance, such a result could be obtained by making use of elastomers, but such materials not only entail great attentuation but are also unsuitable to embody the filler tube.

By deforming the surface of the filler tube radially it is possible to induce lengthwise modes in the liquid. By selecting the mode of vibration of the filler tube and the speed of propagation of the sound wave suitably it is possible to obtain an intrinsic adaptation of impedance.

According to the invention a mode of vibration has therefore been adopted which can be propagated in the existing filler tube and can transfer energy to the liquid efficiently.

It is possible to act on the geometric dimensions of the filler tube so that its impedance is almost the same as that of the liquid. If the impedance is adapted in this way, the occurrence of backscattering is reduced and a great part of the energy supplied can reach the outer surface of the cardboard.

The invention arranges also for elimination of effects due to the occurrence of stationary waves affecting the filler tube, such elimination being obtained by a modulation of frequency, which will be confined, however, within a few percent of the carrier and which has the purpose of displacing spatially over the surface of the filler tube the maxima and minima of the stationary wave over a period of time. In this way the same average effects as those of a progressive wave are obtained.

The elastic field emitted by the cardboard tube is extremely directive. This fact is important since it enables the measurements to be performed with a good spatial resultion.

Variation in the intensity of the acoustic field in correspondence with the lack of continuity between air and liquid is therefore very steep, thereby permitting a precise measurement even when using receivers which are only slightly directive.

The invention arranges to receive the signal, output by the cardboard tube as an ultrasonic vibration, in various methods.

A first preferred embodiment provides for the employment of a matrix of receivers located near the cardboard tube; such matrix consists of a plurality of elements arranged parallel to a generating line of the cardboard tube. The resolution which can be obtained in this way is a function of the distance between one and another of such elementary receivers.

Processing of the signal detected by the elements of the matrices can take place in parallel for all the elements of the matrix or by scanning. It is possible otherwise to arrange for a combined method of measurement.

If it is desired to increase the resolution, it is possible to arrange several matrices which are positioned symmetrically about the cardboard tube but are staggered in the vertical direction. For instance, if there are three matrices, there will be a staggering of one-third of the distance between the receivers of one single matrix.

This embodiment with several matrices can be used also for the measurement of liquids the free surface of which can readily take up configurations which are inclined or not flat, such as liquids having a hig viscosity. In fact, it is possible to process the information thus obtained so as to determine the level, for instance, at the axis of the cardboard tube.

A second preferred embodiment of the invention provides for the employment of a rotary detector, which will include an angular window to measure the signal. Within such angular window there will be an angle below which the portion of surface of the cardboard tube not occupied by the liquid can be seen and within which the signal detected is virtually nil.

As the rotation of the detector proceeds, it will pick up immediately afterwards the signal coming from the portion of the container which contains the liquid.

According to the invention it is possible to arrive at the level of the liquid from the relationship between the angle at which a nil signal is detected and the total aperture of the monitoring window.

The invention is therefore obtained with a procedure to measure the level of a liquid by means of elastic waves, such liquid being contained within an axially moving tube and cooperating with a filler tube, the procedure being characterized in that the filler tube is used as an element in the transmission of elastic waves to the liquid, such elastic waves being picked up outside the axially moving tube.

We shall now describe some preferred embodiments of the invention as non-restrictive examples with the help of the attached figures, in which:

FIG. 1 gives a diagram of the invention as applied to a filler tube;

FIG. 2 shows a possible transducer that generates ultrasonic signals;

FIG. 3 the mode of vibration of the filler tube;

FIG. 4 gives a diagram of a first embodiment of the invention;

FIG. 8 shows a block diagram of the control system of the embodiment of FIG. 5;

FIG. 10 shows a variant;

FIG. 11 shows a block diagram of the control system of the embodiments of FIGS. 4 or 10.

Figure 1:
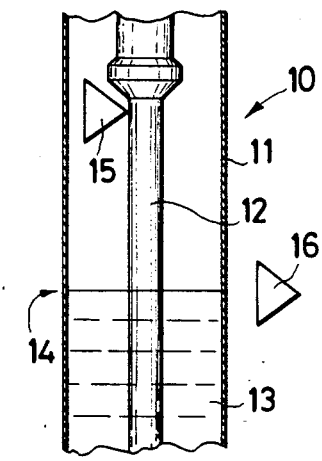

In FIG. 1 the device of the invention bears the reference 10. A filler tube 12 is enclosed in an axially movable cardboard tube 11, which is shown here diagrammatically as being an open cylinder. In the embodiment shown such cardboard tube 11 is formed from a continuous band and is sealed crosswise below the filler tube 12 so as to form in succession a series of finished containers, which are not shown here. Such method of closure is performed, for instance, by heat sealing or ultrasonic welding or other known methods.

According to the invention a transmitter transducer 15 is positioned in contact with an upper portion of the filler tube 12. Such transducer 13 thus coupled to the filler tube 12 causes an ultrasonic vibration to be transmitted through the filler tube 12 to a liquid 13 and thus to a wall of the cardboard tube 11. According to the invention a receiver transducer 16 is located outside the cardboard tube 11 and can pick up an ultrasonic signal emitted by the wall of the cardboard tube 11 itself.

The transmitter tranducer 15 and receiver transducer 16 are shown in a diagrammatic manner in FIG. 1; they will preferably not be coplanar and, for instance, they may be positioned on planes radial to the cardboard tube 11 at 90° to each other, the purpose being to increase the decoupling between the two transducers 15–16. For the sake of simplicity the transducers are shown in FIG. 1 as being coplanar.

Figure 2:
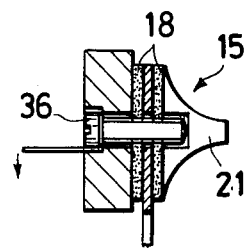

FIG. 2 gives a possible embodiment of a transmitter transducer 15 of a type employing piezoelectric ceramic bodies 18.

An impedance adapter 21 is included in front of the transmitter transducer 15 and in this example is conformed with an exponential form; it serves to adapt acoustic impedance between the transmitter transducer 15 and the filler tube 12. An adjustment screw 36 to regulate the pre-loading on the ceramic bodies 18 can also be seen. As we said earlier, the transmitter transducer 15 energises the vibration of the filler tube 12.

Figure 3:
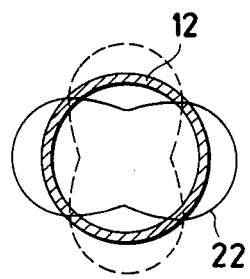

FIG. 3 shows the vibration mode pre-selected for the filler tube 12. It is possible to see that with this method a crosswise section of the filler tube 12 is formed with lobes 22 alternatively located in two mutually perpendicular directions. A configuration comprising more than two lobes 22 is obviously possible. In FIG. 3 the deformation of the filler tube 12 has, of course, been exaggerated for illustrative purposes.

Figure 4:
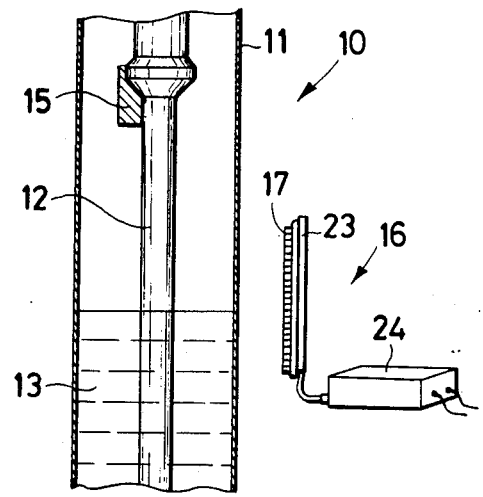

FIG. 4 gives a possible embodiment of the receiver 16, which in this case consists of a matrix 23 of elementary receivers 17, which are positioned in line along a generating line of the cardboard tube 11. The signal picked up by these receivers 17 is sent to a measurement unit 24, in which the signal is processed suitably and converted into a level indication.

The resolution which can be obtained with this system is in proportion to the distance between two elementary transducers 17 of the matrix 23.

A variant shown in FIG. 11 provides for an electromagnetic-elastic transponder for the remote enerization of a transducer that generates ultrasounds. This embodiment enables a transducer of smaller dimensions, preferably in an airtight container, to be employed.

In a further variant shown in FIG. 10 several matrices 23 may be positioned symmetrically about the cardboard tube 11.

In the example shown such matrices 23 are three in number and will be staggered vertically by a distance of one-third of the distance between successive receiver elements 17 of the matrix 23. The resolution of the system is increased in this way; or else it is possible to obtain good resolution also with receivers that by themselves provide low resolution; the resolution of the system using several matrices is the same as that of one single matrix with a lesser distance between receiver elements 17.

Moreover, with the embodiment of FIG. 10 it is possible to determine the momentary orientation of the free surface in a case also where such surface is not horizontal.

Figure 5:
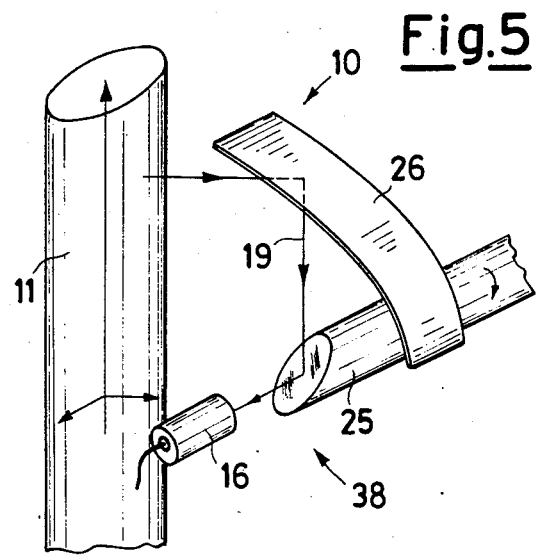
FIG. 5 shows a second embodiment of the invention.

FIG. 5 shows a variant of the invention, in which the measurement of a signal 19 is carried out by scanning along a generating line of the cardboard tube 11; such scanning is performed by means of a suitably powered rotary mirror 25.

Figure 6:
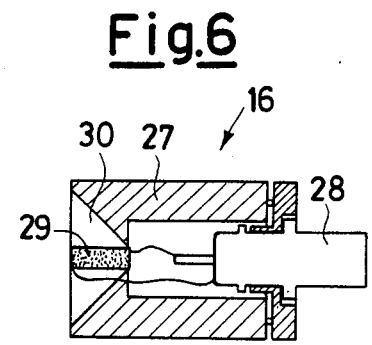
FIG. 6 shows a possible transducer for receipt of the signal.

In the embodiment shown a parabolic reflector 26 reflects the signal 19 towards the rotary mirror 25 located at the focus of the parabola. In this way the signal arriving from various points on a generating line of the cardboard tube 11 reaches the receiver transducer 16 located along the same axis as that of the rotary mirror 25. Such receiver transducer 16 can be structured as in FIG. 6, for instance. A sheath 27 can be seen which is positioned at the rear of a connector 28 in electrical contact with a piezoelectric ceramic body 29, which is the element that monitors the signal. In this example the receiver transducer 16 is equipped with a reflector 30, which may have the shape of a cone or parabola and has the task of picking up a greater quantity of energy of the signal; however, such reflector 30 may also not be included.

Figure 7:
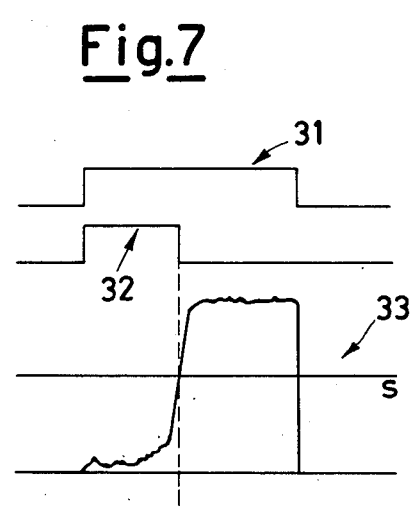
FIG. 7 shows the method of receipt of the signal.

FIG. 7 shows the method of measurement carried out by the device of FIG. 5. The reference number 31 indicates the scanning of the measurement zone, that is to say, a length along the generating line of the cardboard tube 11 is pre-set within which the measurement is performed. Such length corresponds to a given arc of angular rotation of the rotary mirror 25; within this angular window the measurement is carried out, whereas outside such angular window the receiver transducer 16 remains inactive, as we shall see hereinafter.

In FIG. 7 the level measurement is referenced with 32; the step shown corresponds to the angular portion of rotation of the mirror 25 within which a signal of sufficient amplitude is not detected.

When the scanning performed along the generating line of the cardboard tube 11 reaches the level of the liquid (namely in correpondence with the line of dashes in FIG. 7), there is an increase in the signal 33 picked up, which exceeds a given threshold "s". There is a given angular extent of rotation of the mirror in correspondence with such signal received, and in correspondence with such angular extent the signal exceeds the threshold "s" until the end of the scanning.

In the example shown the rotation of the mirror is such as to ensure a scanning length reaching from the air to the liquid within the scanning window. The threshold "s" may be pre-set or be capable of being pre-set or may be adaptive.

FIG. 8 gives a possible control circuit for the embodiment of FIG. 5. A scanner 38 is shown which includes the device of FIG. 5, namely the rotary mirror 25 with its actuation motor and control means.

A block 37 to set the angular window makes possible the pre-setting of the scanning angle of the rotary mirro 25 and therefore the scanning length along the generating line of the cardboard tube 11.

Two in-phase coupling blocks 39 and 40 serve to synchronise the monitoring of the signal and the generation of the signal (41) with the rotation of the mirror 25 of FIG. 5.

The block 41 is a generator or oscillator which sends to the transmitter transducer 15 an electrical signal to be converted into an ultrasonic vibration.

The receiver transducer 16 sends the signal to a preamplifier 42, whence the signal reaches a detector 43, which has the task of measuring the signal reaching the receiver transducer 16 and of providing a mean of such signal. According to a possible measurement method the detector 43 can work as follows: such detector 43 is synchronised with the rotation of the mirror 25, so that the measurement always takes place during the momentary period corresponding with the scanning of the pre-set angular window. Such period is divided into intervals of a pre-set length. Within each of these intervals the detector 43 measures the maximum of the mean found over a pre-set number of cycles of the carrier. This method eliminates from the measurement any disturbances of a high amplitude, but short duration, without undergoing the effect of flattening of the signal which would arise from the execution of a simple arithmetical mean. The signal 33 of FIG. 7 thus obtained is sent to a noise reduction block 44 and thence to a signal processor block 45. Here the signal is compared with the threshold "s" of FIG. 7. The time intervening between the beginning of the window and the surpassing of the threshold (see signal 32 of FIG. 7) provides an angular measurement of the level.

From this angular measurement it is possible to arrive, by geometric considerations, at a linear measurement along the generating line of the cardboard tube 11.

Blocks 46 and 47 in FIG. 8 are two counters which respectively measure the time corresponding to the scanning of the angular window (block 46) and the time corresponding to the scanning of the angular segment running from the beginning of the window to the measurement of the level of the liquid (block 47).

Such times of the window and level respectively are processed by the signal processor block 20 and are converted into a measurement of level, such as, for instance, a linear height corresponding to the actual height of the free surface of the liquid in the cardboard tube 11.

FIG. 11 gives a block diagram of a possible control system for embodiments such as those shown in FIG. 4 or FIG. 10.

Figure 9:
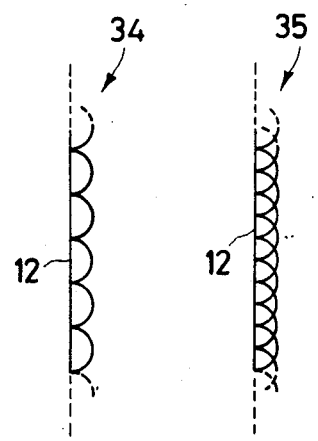
FIG. 9 shows the effect of frequency modulation on the surface of the filler tube.

In this figure a controller unit 50 directs the various functions, synchronization being ensured on the basis of signals arriving from a synchronizer block 60. A block 51 performs modulation of frequency of the signal so as to obtain the effect of FIG. 9, namely, the vibration imparted to the filler tube 12 is modulated in frequency 35 so as to eliminate the effect of stationary waves 34 on the filler tube 12.

Piloting of the transmitter transducer 15 is carried out by means of a power amplifier 52 and, in this example, by means of a transponder 49 which permits remote energization of the transducer 15.

In such embodiment given as an example each of the receiver elements 17 of the matrix 23 is linked to a preamplifier 53. The matrix 23 is operated by a low-noise scanner 54.

The signal reaches a selective amplifier 55 and thence goes to a detector 43 analogous to that of FIG. 8 and having the same function. Such detector 43 produces a mean of the signal in this case too, as shown in FIG. 7 for example.

Block 56 is a sample holder or memory which serves to store the signal coming from one or another of the receiver sensors 17 for suitable time.

A possible line scanning block 57 will be employed where several matrices 23 are being used, as in FIG. 10 for instance.

Lastly, the signal is converted by an analogue/digital converter 58 and sent back to a computer 20.

An output or input unit 59 may be, for instance, a display or another element to show the signal, or may be a control which enables the operator to operate the device.

The block 60 is a master clock which synchronizes all the functions detailed.

INDEX

10—device
11—cardboard tube or container being formed
12—filler tube
13—liquid
14—level of liquid
15—transmitter transducer
16—receiver transducer
17—elementary receivers
18—piezoelectric ceramic bodies
19—ultrasonic signal
20—processing of signal
21—impedance adapter
22—lobes
23—matrix of receivers
24—measurement unit
25—rotary mirror
26—parabolic reflector
27—sheath
28—connector
29—piezoelectric ceramic body
30—reflector
31—scanning of measurement zone
32—signal of level
33—output signal of receiver
34—stationary waves
35—progressive waves
36—adjustment screw
37—angular window setting
38—scanner
39—in-phase coupling block
40—in-phase coupling block
41—oscillator
42—preamplifier
43—detector
44—noise reducer
45—signal processor block
46—window counter
47—level counter
48—signal processor
49—transponder
50—controller unit
51—freqency modulator
52—power amplifier
53—preamplifiers
54—scanner
55—selective amplifier
56—memory
57—line scanning block
58—analogue/digital converter
59—output or input unit
60—synchronizer block

I claim:

1. A method of measuring the level of a liquid comprising the steps of filling a moving, generally tubular, container through a liquid filler tube while the container moves relative to the filler tube, maintaining at least a portion of the filler tube immersed in the liquid within the tubular container, creating energy waves in the filler tube which are transmitted to the liquid in the tubular container, detecting the transmitted energy waves, and converting the detected energy waves into an indication of the liquid level of the liquid in the tubular container.

2. The method as defined in claim 1 wherein the creating step is effected through radial vibration of the filler tube.

3. The method as defined in claim 1 wherein the creating step is effected through generating ultrasonic frequency energy waves.

4. The method as defined in claim 1 including the step of modulating the energy waves imparted to the filler tube to eliminate the effect of stationary waves on the filler tube.

5. The method as defined in claim 1 wherein the creating step is effected upon a non-immersed portion of the filler tube.

6. The method as defined in claim 1 wherein the creating step is effected through impedance matching.

7. The method as defined in claim 1 wherein the detecting step is effected by simultaneously sensing the energy wave at several points along a line lengthwise of the filler tube.

8. The method as defined in claim 1 wherein the detecting step is effected by successively sensing the energy wave at several points along a line lengthwise of the filler tube.

9. The method as defined in claim 1 wherein the detecting step is effected at a single position exteriorly of the tubular container.

10. The method as defined in claim 1 wherein the detecting step is effected at a plurality of positions exteriorly of the container.

11. A device for measuring the level of a liquid comprising filler tube means for introducing liquid into a generally tubular container during movement of the container relative to the filler tube means while maintaining at least a portion of the filler tube means immersed in a liquid, means for creating energy waves in the filler tube means which are transmitted therethrough to the liquid in the tubular container and to the tubular container, means for detecting the transmitted energy waves, and means for converting the detected energy waves into an indication of the liquid level of the liquid in the tubular container.

12. The device as defined in claim 11 wherein said energy wave-creating means includes a transmitter transducer and said detecting means includes a receiver transducer located outside said tubular container.

13. The device as defined in claim 11 wherein said detecting means is located exteriorly of said tubular container.

14. The device as defined in claim 11 including means for modulating the energy wave imparted to the filler tube means to eliminate the effect of stationary waves on the filler tube means.

15. The device as defined in claim 11 wherein said detecting means includes means for effecting simultaneous sensing of the energy wave at several points along a line lengthwise of the filler tube means.

16. The device as claimed in claim 11 wherein said detecting means includes means for effecting successive sensing of the energy wave at several points along a line lengthwise of the filler tube means.

17. The device as defined in claim 11 wherein said detecting means is effected at a single position exteriorly of the tubular container.

18. The device as defined in claim 11 wherein said detecting means are located at a plurality of positions exteriorly of said tubular container.

19. The device as defined in claim 11 wherein said energy wave-creating means includes a transmitter transducer and said transmitter transducer includes an impedance adapter.

20. The device as defined in claim 11 wherein said energy wave-creating means includes a transmitter transducer positioned upon a non-immersed portion of said filler tube means.

21. The device as defined in claim 11 wherein said detecting means includes a receiver transducer located outside said tubular container, and said receiver transducer is formed as a matrix of elementary sensors.

22. The device as defined in claim 11 wherein said detecting means includes a receiver transducer located outside said tubular container, said receiver transducer includes several matrices of elementary sensors, and said matrices of elementary sensors are positioned at different positions about the exterior of the tubular container.

23. The device as defined in claim 11 wherein said detecting means includes a receiver transducer located outside said tubular container, said receiver transducer includes a plurality of matrices circumferentially spaced from each other about the tubular container, each matrix having a plurality of individual sensors immediately adjacent each other, and said matrices being staggered in a vertical direction by a distance less than the distance between the individual sensors.

24. The device as defined in claim 11 wherein said detecting means includes a receiver transducer located outside said tubular container, said receiver transducer is part of a scanner system, said scanner system includes a rotary mirror located at the focus of a parabolic reflector, and the receiver transducer is operatively positioned for operation within an angular window of rotation of said mirror.

25. The device as defined in claim 11 wherein said energy wave-creating means includes a transmitter transducer, said detecting means includes a receiver transducer located outside said tubular container, and said converting means includes detector means for providing a mean of the detected energy wave signal.

26. The device as defined in claim 11 wherein said energy wave-creating means includes a transmitter transducer, said detecting means includes a receiver transducer located outside said tubular container, said converting means includes detecting means for providing a means of said detected energy wave signal, and signal processor means for comparing said detected energy wave signal with a pre-selected threshold.

27. The device as defined in claim 26 including first counter means counting the scanning time and second counting means for counting the time corresponding to the measurement of a signal in excess of the threshold, and means for converting the data of said first and second counting means into an indication of the liquid level of the liquid in the tubular container.

28. The device as defined in claim 11 wherein said energy wave-creating means includes a transmitter transducer, said detecting means includes a receiver transducer located outside said tubular container, said converting means includes detecting means for providing a mean of said detecting energy wave signal, and signal processor means for comparing said detected energy wave signal with an adaptive threshold.

29. The device as defined in claim 28 including first counter means counting the scanning time and second counting means for counting the time corresponding to the measurement of a signal in excess of the threshold, and means for converting the data of said first and second counting means into an indication of the liquid level of the liquid in the tubular container.

* * * * *